United States Patent [19]

Rowe, Jr. et al.

[11] 4,413,331

[45] Nov. 1, 1983

[54] BROAD BEAM TRANSDUCER

[75] Inventors: Linwood M. Rowe, Jr., Glen Burnie; Dale D. Skinner; John H. Thompson, both of Severna Park, all of Md.

[73] Assignee: Westinghouse Electric Corp., Pittsburgh, Pa.

[21] Appl. No.: 680,254

[22] Filed: Apr. 26, 1976

[51] Int. Cl.[3] .......... H04B 13/00

[52] U.S. Cl. .......... 367/151; 310/334; 310/335; 310/337; 310/327; 367/155; 367/162

[58] Field of Search .......... 310/8.2, 8.6, 8.7, 9.1, 310/9.5, 9.6, 334, 335, 327, 337; 340/9, 10; 367/151, 153, 155, 156, 157, 159, 162, 167, 172, 176

[56] References Cited

U.S. PATENT DOCUMENTS

| | | | |
|---|---|---|---|
| 2,753,543 | 7/1956 | Rymes | 340/8 FT |
| 2,923,916 | 2/1960 | Woodworth | 340/10 X |
| 3,067,345 | 12/1962 | Harris | 310/9.1 X |
| 3,144,090 | 8/1964 | Mazzagatti et al. | 340/10 |
| 3,182,284 | 5/1965 | Green | 310/8.7 X |
| 3,351,901 | 11/1967 | Padberg, Jr. | 340/8 FT |
| 3,409,869 | 11/1968 | McCool et al. | 340/9 |
| 3,713,086 | 1/1973 | Trott | 310/9.5 X |
| 3,922,572 | 11/1975 | Cook | 310/9.1 |
| 3,992,693 | 11/1976 | Martin et al. | 340/10 |

*Primary Examiner*—Harold J. Tudor
*Attorney, Agent, or Firm*—D. Schron

[57] ABSTRACT

A transducer made up of a plurality of piezoceramic tubes arranged in end to end relationship with elastomeric material between tubes. The tubes are poled and driven axially; however, the hoop mode of operation is utilized to obtain a fan-shaped beam extremely narrow in one direction and extremely broad in the direction perpendicular thereto. A suitable backing arrangement is provided for the transducer when mounted on a support body to prevent degradation of the beam pattern.

2 Claims, 20 Drawing Figures

BROAD BEAM TRANSDUCER

The invention herein described was made in the course of or under a contract or subcontract thereunder with the Department of the Navy.

BACKGROUND OF THE INVENTION

1. Field of the Invention

The invention in general relates to electrostrictive transducers and particularly to electrostrictive transducers which produce fan-shaped beams.

2. Description of the Prior Art

In many situations it is desirable for a sonar system to use a transducer which will produce a fan-shaped beam, that is, a beam which is relatively narrow in one dimension and relatively broad in another dimension. These transducers find application in various systems such as in a side looking sonar system, wherein the transducer, mounted on a carrier vehicle, produces a fan-shaped beam aimed out to the side of the carrier with a typical horizontal transducer beamwidth of a few tenths of a degree and a typical vertical transducer beamwidth of 70° to 75° (measured at the 3 dB points) by way of example.

For some applications of a fan-shaped beam, there is a requirement for a much broader vertical breamwidth, for example 150° or greater and the available side looking sonar transducers are not capable of forming such beam.

One well known method for achieving a very broad beamwidth for a line transducer is to use piezoelectric tubes as the active elements. These tubes, axially arranged, can produce an omnidirectional beam pattern in the plane perpendicular to the tube axis. At relatively high frequencies, for example in the hundreds of kilohertz, it is extremely difficult to obtain high quality tubular active elements which radiate (or respond) uniformly in the radial direction. In addition to the high costs of such tubes, an added expense occurs if the tubes are not all exactly tuned to the desired operating frequency. In such instance, the outside diameters of the tube must be reduced necessitating first a removal of the electrode covering the outer surface of the tube and then a replacement thereof after the reduction in size.

SUMMARY OF THE INVENTION

In the present invention an extremely broad beam is provided by a line transducer made up of a plurality of tubular electrostrictive transducer elements axially arranged along a common axis. The elements have electrodes on the end surfaces thereof, and are poled in the axial direction. Although the elements are driven axially, the hoop, or radial mode of operation is utilized and isolation means are provided to separate adjacent ones of the elements for axially decoupling the elements from one another. When utilized in conjunction with a carrier, backing means are provided to prevent unwanted acoustic reflections and to maintain the desired beam pattern.

DESCRIPTION OF THE PREFERRED EMBODIMENTS

Figure 1:
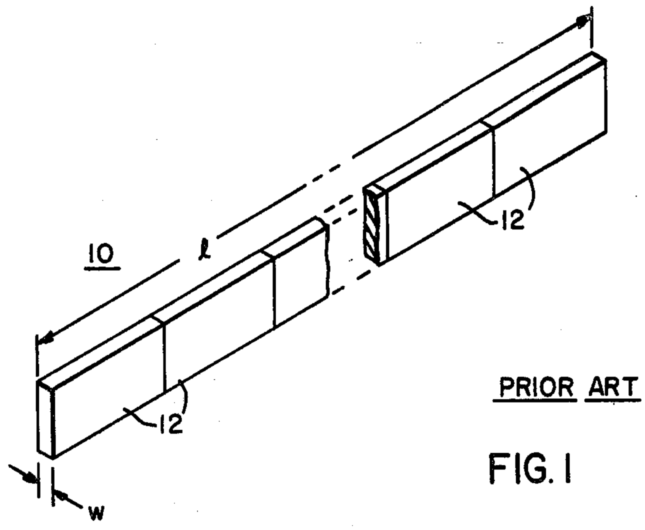
PRIOR ART FIG. 1
FIG. 1 illustrates a typical side looking sonar transducer.

Referring now to FIG. 1, there is illustrated a line transducer 10 made up of a plurality of rectangular transducer elements 12 arranged in end to end relationship. The transducer has length l and width w such that the rectangular active surface is 1 times w. A typical width w may be in the order of 0.75 wavelengths (λ) which defines one beamwidth, and a typical length 1 may be several hundred wavelengths long, defining the beamwidth in the direction perpendicular to the first beamwidth.

Figure 2:
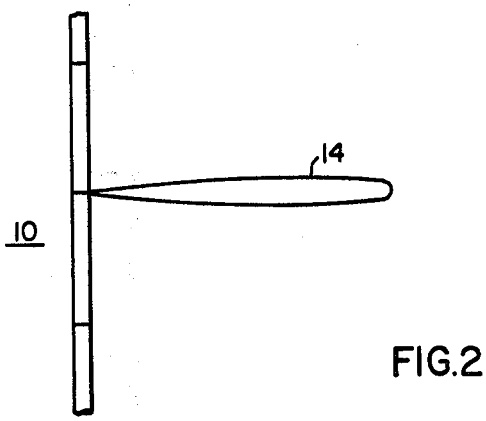
FIG. 2 illustrates the horizontal beam pattern for the transducer of FIG. 1.
Figure 3:
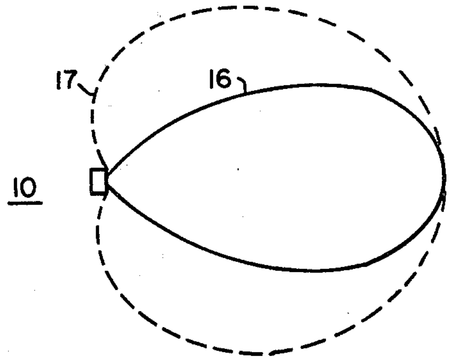
FIG. 3 illustrates the vertical beam pattern for the transducer of FIG. 1, and a desired beam pattern.

For example, and with reference to FIG. 2, transducer 10 provides a horizontal beam pattern 14 which is typically 0.1° to 0.3°, as measured at the 3 dB points. With a typical width w of 0.75λ, the vertical beam pattern 16, as shown in FIG. 3, will about a 75° beamwidth, as measured at the 3 dB points. What is desired for some applications however is a much wider beamwidth as illustrated by beam pattern 17 shown in dotted lines.

Figure 4:
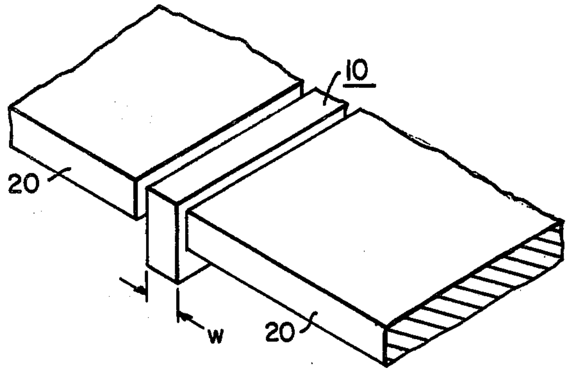
FIG. 4 illustrates a hypothetical arrangement for obtaining a very broad beam from the transducer of FIG. 1.

Theoretically, and with reference to FIG. 4, the front face of transducer 10 can be considered to be a rather long narrow rectangular piston. If this piston is further assumed to be within an infinite rigid baffle 20, the broad beam can be made as wide as desired by reducing the face width w. According to theory, a transducer with a width of about 0.45λ will produce a beamwidth of 150° and a transducer width of 0.4λ will produce a beamwidth of 180°.

In actual practice, however, the housing in which the transducer is mounted does not constitute an infinite rigid baffle, and the maximum beamwidth obtainable is limited. Materials such as lead sheet, or rods or bars of tungsten have been tried as baffles 20 and in actual practice it has not been possible to obtain beamwidths as predicted by theory for a rigid baffle. There is no material or construction method available that is infinitely rigid, and therefore the transducer element will force the baffle to vibrate if used as a projector or vibrations of the baffle will be coupled into the transducer element if used as a hydrophone.

Figure 5:
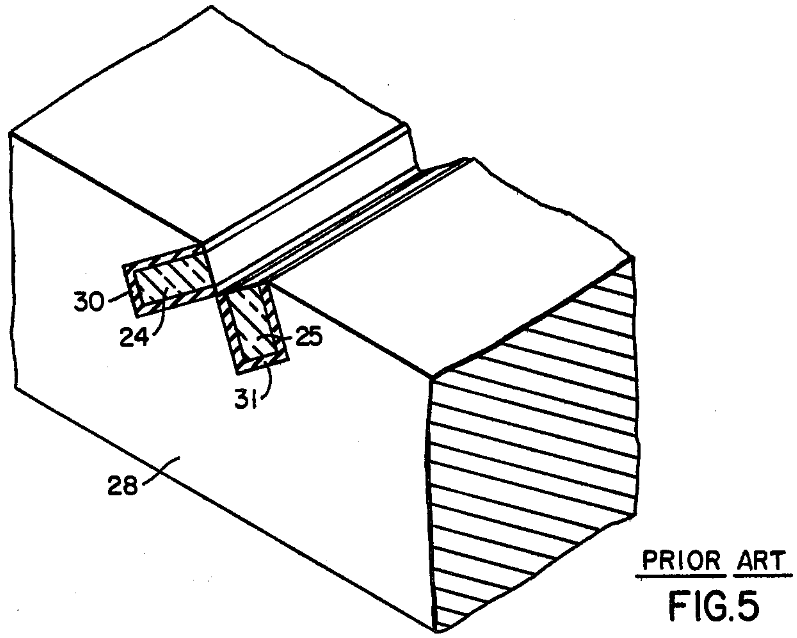
PRIOR ART FIG.5
FIGS. 5 and 6 illustrate prior art attempts for attaining a broad beam from a line transducer.

Attempts have also been made to increase the beamwidth of this type of transducer by changing the orientation or shape of the front face of the transducer element. FIG. 5 illustrates one attempt using two transducer elements of the type illustrated in FIG. 1, placed at angles as shown in FIG. 5. The two transducer elements 24 and 25 are placed into respective grooves in a block or baffle 28 made of a baffle material such as lead. The transducer elements 24 and 25 are surrounded on three sides by respective compliant material 30 and 31 to minimize coupling between the elements and the baffle. Operation of the resulting transducer results in a beam pattern which at times may be very broad, but over the course of operation varies to an objectionable degree.

Figure 6:
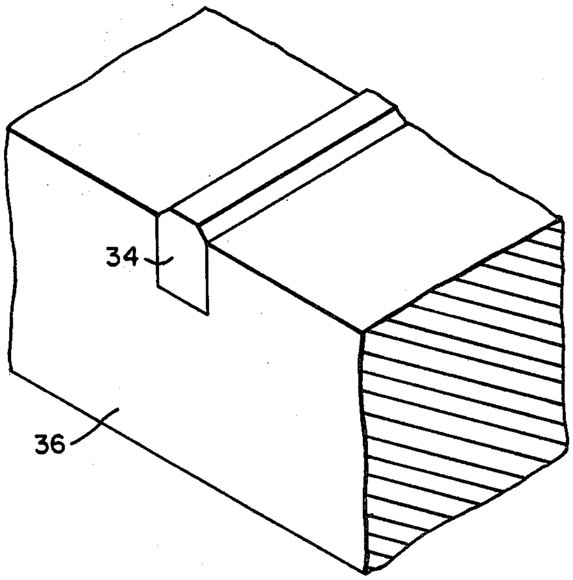
PRIOR ART FIG.6

Another arrangement, as illustrated in FIG. 6, utilizes a transducer element 34 which has the edges on its active face ground away at a 45° angle to attempt to induce sideways motion to the water. The transducer element is set into a block of sound absorbing material 36, one example of which is known by the name of SOAB, a sound absorbing rubber with aluminum flakes dispersed therein. Although such construction increases the broad beamwidth over that of a typical side looking sonar transducer, the desired beamwidth 17 as illustrated in FIG. 3, is not attainable.

Figure 7:
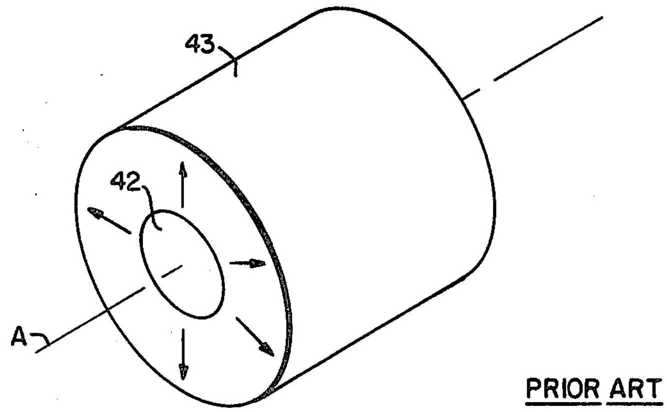
PRIOR ART FIG. 7
FIG. 7 illustrates a radially poled electrostrictive tubular transducer element of the prior art.

One type of line transducer which does provide a broad beam, utilizes electrostrictive tubular transducer elements arranged in end to end relationship along a common axis and are used to produce an omnidirectional beam pattern in the plane perpendicular to the tube axis. One such transducer element 40 is illustrated in FIG. 7, and includes an inner electrode 42 and an outer electrode 43. The element is radially poled as indicated by the arrows, and with suitable electrical connections to the electrodes, is operated in the radial or hoop mode. At higher frequencies, for example in the hundreds of kilohertz, it is extremely difficult to obtain high quality piezoceramic tubes at a reasonable price, which radiate or respond uniformly in the radial direction. Due to the overall high price of the individual elements, the cost of the transducer becomes extremely high especially for line transducers of a length which requires tens or hundreds of such elements.

Additionally, for proper operation all of the elements of the line array must have the same resonant frequency, as governed, inter alia, by the mean diameter of the tube. To obtain the uniformity, it is sometimes necessary to shave down the outside surface of the tube to change the value of its resonant frequency to conform to the desired value. This operation requires, thereafter, the replacement of the electrode 43 and can be a very time-consuming and expensive operation.

Figure 8:
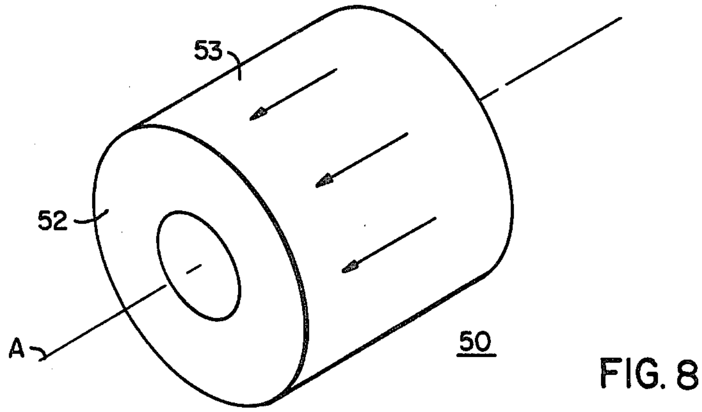
FIG. 8 illustrates an axially poled electrostrictive tubular transducer element for use in the present invention.

The present invention utilizes an electrostrictive tubular transducer element, such as element 50 illustrated in FIG. 8, with the element being poled, not in the radial direction as in FIG. 7, but in the axial direction as illustrated by the arrows. Although the hoop mode of operation is utilized, the element is driven in the axial direction by the provision of electrodes 52 and 53 on the ends of the tube. Such tubes can be purchased commercially however one method for obtaining a uniform plurality of such elements all having the same operating characteristics including a uniform resonant frequency is illustrated in FIGS. 9A through 9E, to which reference is now made.

Initially, a sheet 56 of electrostrictive material such as PZT (lead zirconate titanate) is temporarily affixed to a base such as plastic plate 59. The sheet 56 has a thickness L and is polarized in the direction of the arrows. The sheet 56 has its upper and lower surfaces silvered, and is a commercially available item.

Figure 9A:
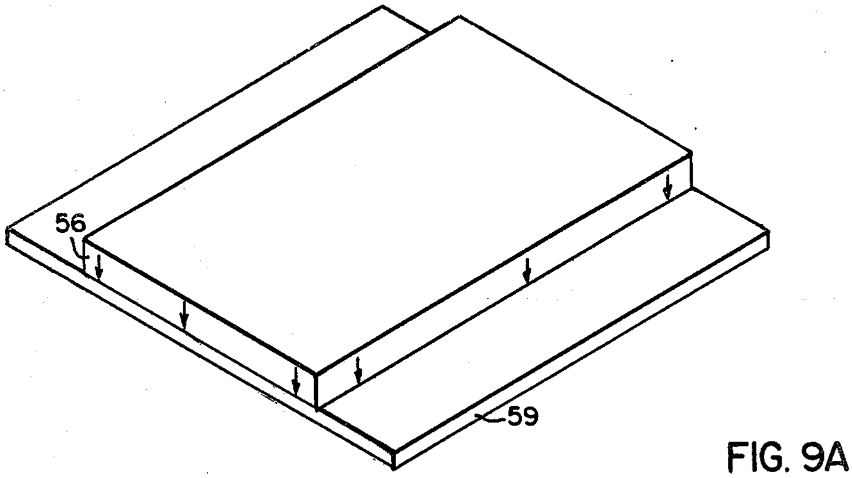
FIGS. 9A through 9E illustrate the manufacture of tubular elements such as in FIG. 8.
Figure 9B:
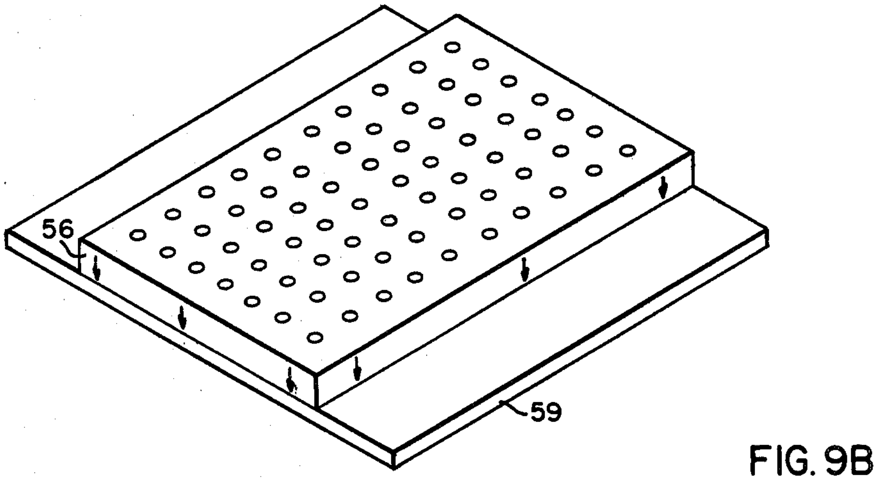

In the next step, as illustrated in FIG. 9B, a plurality of equally spaced holes is drilled in sheet 56 all the way through, and into plate 59.

Figure 9C:
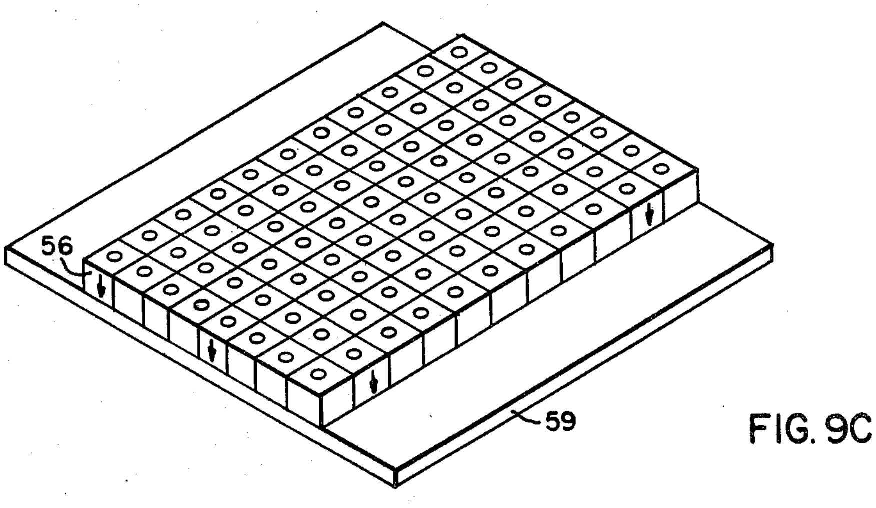
Figure 9D:
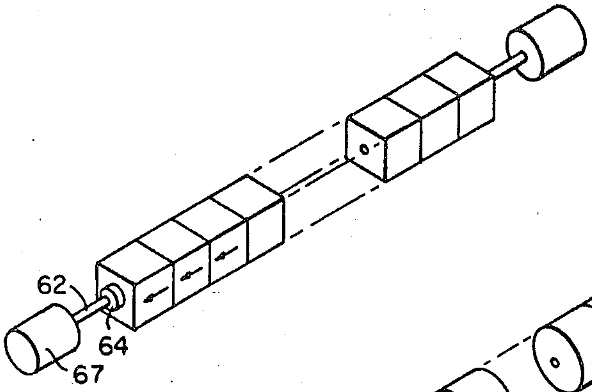
Figure 9E:
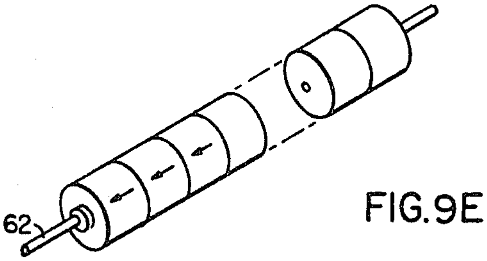

Thereafter, as illustrated in FIG. 9C, sheet 56 is diced into individual sections, each including one of the drilled holes of step 9B. As illustrated in FIG. 9D, the diced segments are removed from plate 59 and are fitted onto a rod 62 and tightly held in place thereon such as by fitting 64. The assembly is then rotated by mechanism 67 while a grinding operation on the outside surface of the array forms circular or tubular elements as in FIG. 9E, with each element being identical to element 50 of FIG. 8 with each having an axial length, L.

The dimensions of the elements will be governed by the electrostrictive material, as well as the desired resonant frequency. For example, the radial resonant frequency $F_R$ is given by the relationship:

$$F_R = K1/d \qquad (1)$$

where:

$F_R$ is the radial resonant frequency

K1 is a constant governed by the electrostrictive material d is the mean diameter of the tube.

The axial resonant frequency $F_A$ is given by the relationship:

$$F_A = K2/L \qquad (2)$$

where:

$F_A$ is the axial resonant frequency

K2 is a constant governed by the electrostrictive material

L is the axial length of the tube.

Since operation of the transducer of the present invention is in the radial, or hoop mode, but is driven in the axial direction, it is important that the transducer be designed such that the axial resonant frequency is much greater than the radial resonant frequency so as not to interfere with proper operation. For example, in one transducer construction, tubular elements such as illustrated in FIG. 8 were fabricated from a PZT sheet having a one-eighth inch thickness (L=0.125 inches). The inside diameter of the tube was 0.080 inches and the outside diameter was 0.165 inches. With K1 having a value of 37.36, the radial resonant frequency is 305 kilohertz while the axial resonant frequency (K2=67.5) is 540 kilohertz, over 77% higher than the radial resonant frequency.

Figure 10A:
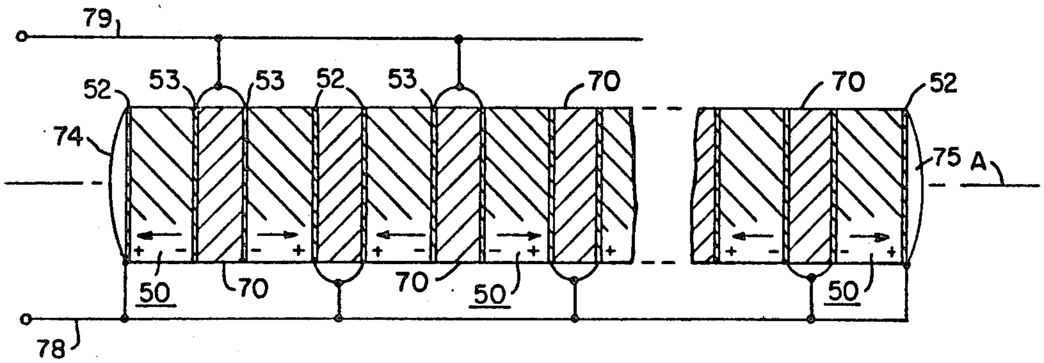
FIGS. 10A and 10B illustrate embodiments of the present invention utilizing elements as in FIG. 8.

A line transducer according to the teachings of the present invention is illustrated in FIG. 10A. The transducer is made up of a plurality of elements as illustrated in FIG. 8, axially arranged along a common central axis A. In order to provide compliant coupling between elements 50 to reduce mechanical resonant modes in the axial direction, there is provided isolation means which separate adjacent ones of the elements 50 for axially decoupling the elements from one another. The isolation means may be in the form of relatively thin elastomeric washers which may, if desired, additionally have included nylon, linen, or polyester threads dispersed therein. In effect, the gas which is naturally trapped in the threads acts as a further decoupling mechanism.

Other forms of decoupling means may be utilized including the use of ordinary paper. For the dimensions previously given for the tube, the length in the axial direction of the elastomeric washers 70 may be in the order of 0.01 inches. The end elements are capped with pressure release material 74 and 75 in order to reduce the axial stress from the acoustic pressure field. Pressure release materials commonly used in transducer systems include paper, a mixture of cork and neoprene rubber known as Corprene, and balsa wood, to name a few.

Figure 10B:
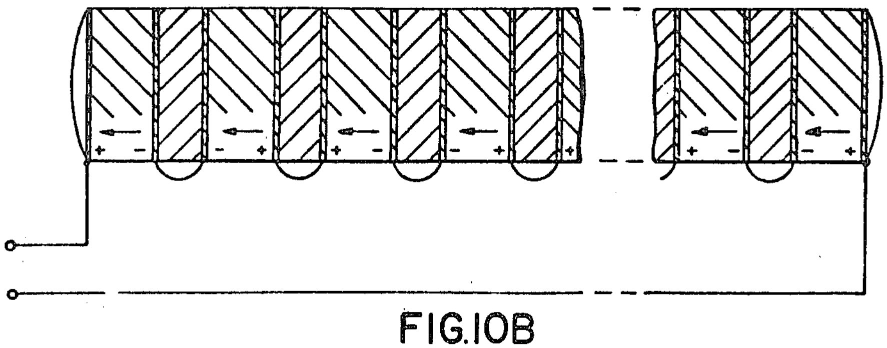

For the embodiment of FIG. 10A, adjacent transducer elements 50 are oppositely poled, in the axial direction. For such an arrangement, signal lead 78 is commonly connected to all of the electrodes 52 while signal lead 79 is commonly connected to all of the electrodes 53. A transducer arrangement utilizing a series connection of transducer elements is illustrated in FIG. 10B and for some desired operations, the elements could be connected in a series-parallel arrangement.

Figure 11:
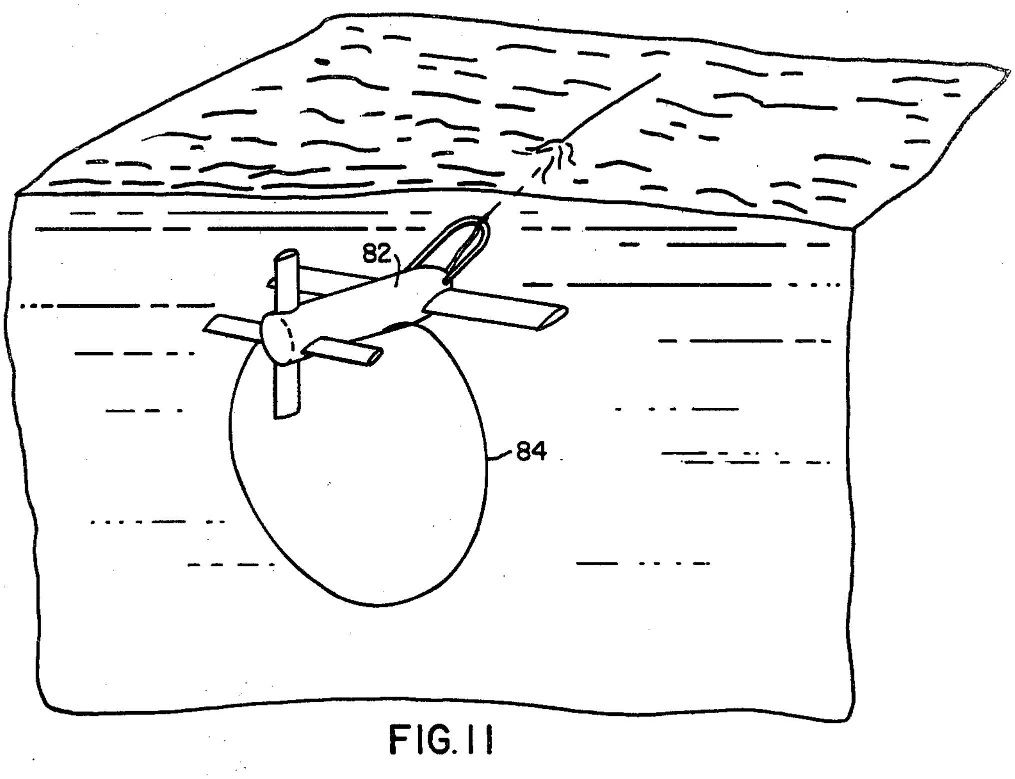
FIG. 11 illustrates the transducer apparatus on a carrier vehicle.

The transducer thus described may be utilized in conjunction with the carrier vehicle to provide an extremely broad beam. For example, FIG. 11 illustrates an under-water carrier vehicle 82 which may be connected to some towing vehicle (not shown) and which includes on the under-surface thereof, a transducer for providing a broad beam pattern 84. The transducer described, for example with respect to FIG. 10A, may not function properly in the presence of a large body, such as the carrier vehicle 82, since reflection from such body will greatly modify the beam pattern produced. Accordingly, means are provided to reduce or substantially eliminate unwanted acoustic reflection to maintain beam shape integrity. This may be accomplished in a number of ways such as illustrated in FIGS. 12A through 12B, to which reference is now made.

Figure 12A:
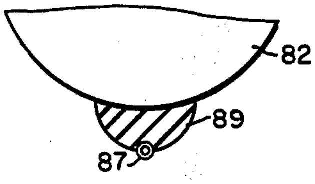
Figs. 12A–12D illustrate backing arrangements for the transducer when mounted on a carrier vehicle.

FIG. 12A illustrates an axial view of a tubular transducer 87, such as illustrated in FIG. 10A, mounted below the carrier vehicle 82 with a lossy material 89 as a transducer backing material interposed between transducer 87 and carrier vehicle 82. For convenience, the usual covering and protection members as well as acoustic coupling materials for the transducer apparatus is not illustrated. The lossy material 89 will attenuate the acoustic energy radiated toward the carrier vehicle 82 and echoes from it so as to lessen the influence of the echoes. The material is chosen to have an acoustic impedance substantially equal to the acoustic impedance of the surrounding water medium, SOAB being one example.

At the higher frequencies the SOAB produces sufficient attenuation of the acoustic energy. At lower frequencies, however, the attenuation may not be quite adequate and the beam pattern may fluctuate. FIG. 12B illustrates an arrangement which will also maintain the beam pattern even at the lower frequency, and includes a directional reflector 92 between the transducer 87 and the carrier vehicle 82 so that energy which would reflect from the carrier vehicle is reflected in directions which will not interfere with the transducer beam pattern in the desired direction. For example, if the angle $\theta$ is 45°, any acoustic energy radiating from the transducer will be reflected up into the upper hemisphere and will not interfere with the beam pattern in the lower hemisphere. The angle can be varied to deflect the energy in any desired direction. Another consideration for choosing the angle $\theta$ is that the angle of incidence of acoustic energy should be beyond the critical angle for the reflected material chosen so as to ensure total reflection of acoustic energy. This will assure that no acoustic energy penetrates into the reflector from the transducer where it might be re-radiated in an undesired direction after internal reflections. For example, if the surrounding medium is water and the reflector is aluminum, $\theta$ must be less than 61° to meet this criterion. This will ensure that neither longitudinal nor shear wave energy will penetrate into the reflector and that total reflection of the energy will occur.

Figure 12C:
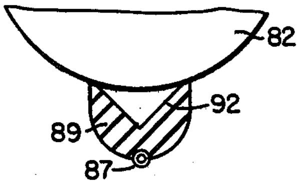
Figure 12B:
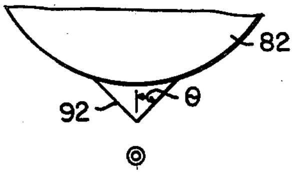

A third technique is illustrated in FIG. 12C and is a combination of the arrangement of FIG. 12B and FIG. 12A, that is, directional reflector 92 is utilized, and the volume between between it and transducer 87 is filled with a sound absorbing material 89 as in FIG. 12A. Reflected acoustic energy is not only reflected in a non-critical direction but is attenuated by the sound absorbing material.

Figure 12D:
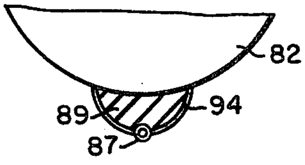

A fourth technique, illustrated in FIG. 12D, utilizes a sound absorbing material 89 of FIG. 12A and will trap unwanted energy there by means of a acoustic reflective layer 94 such as a sheet of lead. Acoustic energy radiated from the tube toward the carrier vehicle and reflecting from it will be attenuated in the sound absorbing material 89 and will undergo multiple reflections from the carrier vehicle and reflective layer 94 adding to the number of times it traverses the sound absorbing material, thus increasing the total attenuation.

We claim as our invention:

1. Electroacoustic transducer apparatus comprising:

(A) a carrier vehicle;

(B) a plurality of tubular electrostrictive transducer elements carried by said vehicle and being axially arranged along, and all symmetrically disposed about, a common axis and all operable at the same radial resonant frequency;

(C) isolation means separating adjacent ones of said elements for axially decoupling said elements from one another;

(D) each said element including electrode means on the end surfaces thereof and being poled in said axial direction;

(E) backing means positioned between said carrier vehicle and said plurality of elements to prevent unwanted reflections of acoustic energy and distortion of the beam pattern of said apparatus;

(F) said backing means being an acoustic absorbing material; and (G) said backing means including an acoustic reflecting layer disposed over said acoustic absorbing material.

2. Electroacoustic transducer apparatus comprising:

(A) a carrier vehicle;

(B) a plurality of tubular electrostrictive transducer elements carried by said vehicle and being axially arranged along, and all symmetrically disposed about, a common axis and all operable at the same radial resonant frequency;

(C) isolation means separating adjacent ones of said elements for axially decoupling said elements from one another;

(D) each said element including electrode means on the end surfaces thereof and being poled in said axial direction;

(E) backing means positioned between said carrier vehicle and said plurality of elements to prevent unwanted reflections of acoustic energy and distortion of the beam pattern of said apparatus;

(F) said backing means being an acoustic directional reflector; and (G) said reflector including an acoustic absorbing material covering the outside surface of said reflector.

* * * * *